United States Patent
Murata et al.

(10) Patent No.: US 12,283,402 B2
(45) Date of Patent: Apr. 22, 2025

(54) SUSPENSION WIRING MODULE

(71) Applicant: SUMITOMO WIRING SYSTEMS, LTD., Mie (JP)

(72) Inventors: Takahiro Murata, Mie (JP); Kenta Kobayashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 299 days.

(21) Appl. No.: 17/915,647

(22) PCT Filed: Mar. 31, 2020

(86) PCT No.: PCT/JP2020/014747
§ 371 (c)(1),
(2) Date: Sep. 29, 2022

(87) PCT Pub. No.: WO2021/199242
PCT Pub. Date: Oct. 7, 2021

(65) Prior Publication Data
US 2023/0113124 A1    Apr. 13, 2023

(51) Int. Cl.
*H01B 7/02* (2006.01)
*B60R 16/02* (2006.01)
*H02G 3/02* (2006.01)

(52) U.S. Cl.
CPC ........... *H01B 7/02* (2013.01); *B60R 16/0215* (2013.01); *H02G 3/02* (2013.01)

(58) Field of Classification Search
CPC . H01B 7/02; H01B 7/04; H01B 7/009; H01B 7/0045; H01B 7/1895; H01B 7/1865; H01B 7/1875; H01B 7/187; H01B 7/40; H01B 9/006; H01B 9/02; H01B 9/04; H01B 11/02; H01B 11/04; H01B 11/1033; H02G 3/02; H02G 3/32; H02G 3/04; H02G 3/0468; B60R 16/02; B60R 16/0215; B60R 16/023; B60R 16/0207
USPC ........ 174/72 R, 72 A, 102 R, 103, 105, 106, 174/110 R, 113 R, 117 R, 117 F, 117 FF
See application file for complete search history.

(56) References Cited

U.S. PATENT DOCUMENTS

| | | | |
|---|---|---|---|
| 2,933,550 A * | 4/1960 | Cole | H02G 15/18 174/76 |
| 9,545,888 B2 * | 1/2017 | Ito | H01B 9/006 |
| 10,707,666 B2 * | 7/2020 | Kawaguchi | H01B 7/0045 |
| 10,741,306 B2 * | 8/2020 | Kobayashi | B60R 16/023 |
| 2013/0277087 A1 * | 10/2013 | Hayakawa | B60R 16/0215 174/107 |
| 2015/0165987 A1 | 6/2015 | Hayakawa et al. | |
| 2015/0165988 A1 | 6/2015 | Hayakawa et al. | |
| 2016/0339854 A1 | 11/2016 | Hayakawa et al. | |

(Continued)

FOREIGN PATENT DOCUMENTS

| JP | 2014-007046 A | 1/2014 |
|---|---|---|
| JP | 2015-103424 A | 6/2015 |

*Primary Examiner* — William H. Mayo, III
(74) *Attorney, Agent, or Firm* — Venjuris, P.C.

(57) ABSTRACT

A suspension wiring module includes a suspension wiring member including a transmission line main body and at least one coating layer that covers the transmission line main body. At least one section of the suspension wiring member is defined as an exterior section that is provided outside of a cabin of a vehicle. In the exterior section, an arc-shaped groove is formed in an outer coating that is the outermost one of the at least one coating layer.

6 Claims, 3 Drawing Sheets

(56) References Cited

U.S. PATENT DOCUMENTS

| | | |
|---|---|---|
| 2018/0134239 A1 | 5/2018 | Hayakawa et al. |
| 2019/0210543 A1 | 7/2019 | Hayakawa et al. |
| 2020/0105441 A1* | 4/2020 | Yamamoto ............... H01B 7/40 |
| 2020/0111587 A1* | 4/2020 | Kim .................... H01B 7/0045 |
| 2021/0291762 A1 | 9/2021 | Hayakawa et al. |

* cited by examiner

SUSPENSION WIRING MODULE

CROSS REFERENCE TO RELATED APPLICATIONS

This application is a national phase of PCT application No. PCT/JP2020/014747, filed on 31 Mar. 2020, of which is incorporated herein by reference.

TECHNICAL FIELD

The present disclosure relates to a suspension wiring module.

BACKGROUND

Patent Document 1 discloses a composite cable obtained by covering an electric brake cable and an ABS sensor cable with an outer sheath and integrating them together.

PRIOR ART DOCUMENT

Patent Document

Patent Document 1: JP 2013-237428 A

SUMMARY OF THE INVENTION

Problems to be Solved

There has been a need for an easily bendable wire harness for connecting a vehicle-side device and a wheel-side device.

Accordingly, it is an object of the present disclosure to provide a suspension wiring module for connecting a vehicle-side device and a wheel-side device, wherein a wiring member is configured to be easily bent.

Means to Solve the Problem

A suspension wiring module according to the present disclosure is a suspension wiring module including: a suspension wiring member including a transmission line main body and at least one coating layer that covers the transmission line main body, wherein at least one section of the suspension wiring member is defined as an exterior section that is provided outside of a cabin of a vehicle, and in the exterior section, an arc-shaped groove is formed in an outer coating that is the outermost one of the at least one coating layer.

Effect of the Invention

According to the present disclosure, in a suspension wiring module for connecting a vehicle-side device and a wheel-side device, a wiring member can be easily bent.

DETAILED DESCRIPTION TO EXECUTE THE INVENTION

Figure 1:
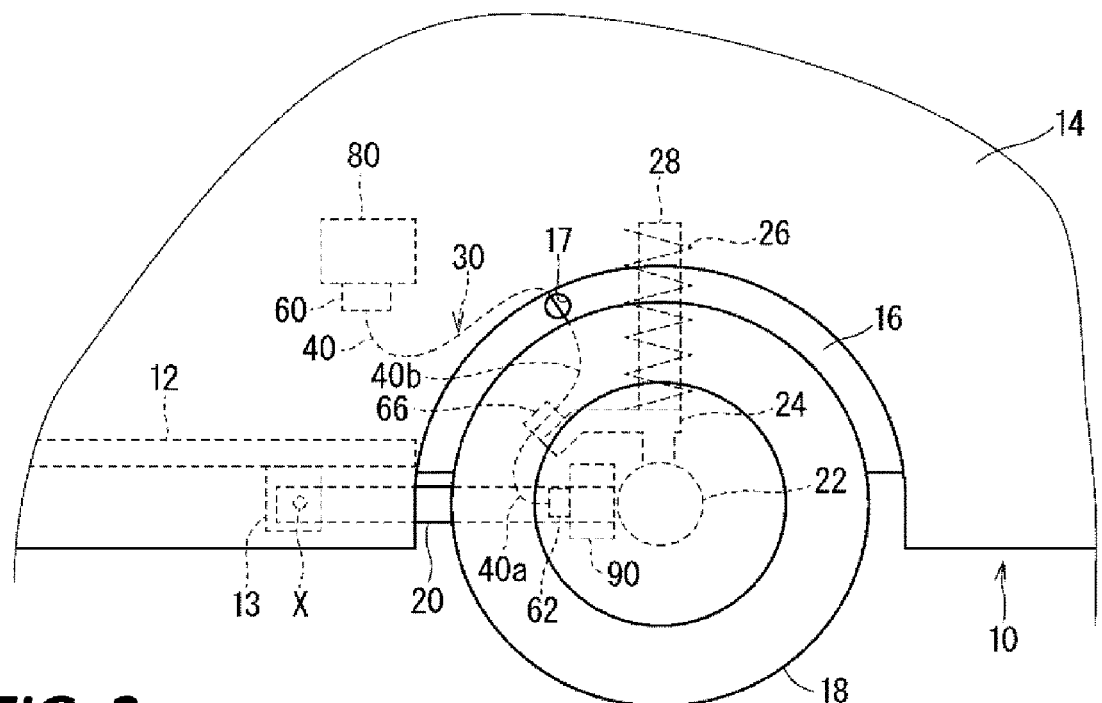
FIG. 1 is a schematic diagram showing an example of a configuration of a suspension of a vehicle.

Description of Embodiment of the Present Disclosure

First, aspects of an embodiment according to the present disclosure will be listed and described.

A suspension wiring module according to the present disclosure is configured as follows.

(1) A suspension wiring module including: a suspension wiring member including a transmission line main body and at least one coating layer that covers the transmission line main body, wherein at least one section of the suspension wiring member is defined as an exterior section that is provided outside of a cabin of a vehicle, and in the exterior section, an arc-shaped groove is formed in an outer coating that is the outermost one of the at least one coating layer. As a result of the arc-shaped grooves being formed in the outer coating of the suspension wiring member, the suspension wiring member can be easily bent.

(2) The suspension wiring module according to statement (1) may further include a plurality of fixing components for positioning the suspension wiring member to the vehicle, the plurality of fixing components being provided spaced apart from each other in an extension direction of the suspension wiring member, and the arc-shaped groove may be formed in a section between the plurality of fixing components. With this configuration, the portion between the fixing components of the suspension wiring member can be easily bent.

(3) In the suspension wiring module according to statement (2), the plurality of fixing components may include a first fixing component and a second fixing component that is provided at a position next to the first fixing component, and in a section between the first fixing component and the second fixing component, the arc-shaped groove may be formed at at least a position that is close to the first fixing component relative to a center position between the first fixing component and the second fixing component. With this configuration, a portion that is close to the first fixing component of the suspension wiring member can be easily bent.

(4) In the suspension wiring module according to statement (3), a first arc-shaped groove and a second arc-shaped groove may be formed spaced apart from each other in the extension direction of the suspension wiring member from the first fixing component, and a spacing between the first fixing component and the first arc-shaped groove may be larger than a spacing between the first arc-shaped groove and the second arc-shaped groove. With this configuration, a situation is suppressed from occurring in which the suspension wiring member is steeply bent at a position that is close to the first fixing component.

(5) In the suspension wiring module according to any one of statements (1) to (4), a portion of the outer coating where the arc-shaped groove is formed may be thinner than a portion of the outer coating where the arc-shaped groove is not formed. With this configuration, as a result of the portion of the outer coating where the arc-shaped groove is formed being configured to be locally thin, the suspension wiring member can be easily bent.

(6) In the suspension wiring module according to any one of statements (1) to (5), the arc-shaped groove may be formed in a section that is included in the exterior section and is repeatedly bent along with an oscillation of a suspension. With this configuration, a structure that allows the suspension wiring member to be easily bent is provided in a portion where the suspension wiring member is easily bent.

(7) In the suspension wiring module according to any one of statements (1) to (6) the arc-shaped groove may be an annular groove. With this configuration, the suspension wiring member can be easily bent at any portion in the circumferential direction where the annular groove is formed.

Detailed Description of Embodiment of the Present Disclosure

A specific example of a suspension wiring module according to the present disclosure will be described below with reference to the drawings. It is to be noted that the present disclosure is not limited to the example given below, and the scope of the present disclosure is indicated by the appended claims, and all changes that come within the meaning and range of equivalency of the claims are intended to be embraced within the scope of the present disclosure.

Embodiment 1

Hereinafter, a suspension wiring module (hereinafter referred to simply as a "wiring module") according to Embodiment 1 will be described. The wiring module is a member that is routed in a suspension of a vehicle. A configuration of a suspension of a vehicle will be described first with reference to FIG. 1. FIG. 1 is a schematic diagram showing an example of a configuration of a suspension of a vehicle.

Example of Configuration of Suspension of Vehicle

A vehicle body 10 is a body of an automobile. FIG. 1 shows the vicinity of a wheel 18 in the vehicle body 10. The vehicle body 10 includes a floor portion 12 and a body portion 14. The floor portion 12 is a portion that faces the ground. The body portion 14 is provided on the upper side of the floor portion 12, and functions as an exterior part of the vehicle body 10. The vehicle body 10 may be a monocoque body formed by integrating a frame and a body that are rigid members, or may be configured by mounting a body on a frame. In the description given below, a direction in which an automobile normally runs may be referred to as the "front direction", and the other direction may be referred to as the "rear direction".

The wheel 18 is rotatably supported by the vehicle body 10. In the example shown in FIG. 1, the wheel 18 is rotatably supported in a fender apron 16. A suspension system (suspension) may support the wheel 18 using any suspension method such as an axle suspension method, an independent suspension method, and a torsion beam suspension method. In the example shown in FIG. 1, a lower arm 20 and a knuckle arm 24 support the wheel 18. More specifically, the lower arm 20 is provided to extend in the front-rear direction of the vehicle body 10. In this example, a proximal end portion of the lower arm 20 extends in the front direction relative to the wheel 18. The proximal end portion of the lower arm 20 is oscillatably supported by a vehicle body-side support portion 13. An axis X about which the proximal end portion of the lower arm 20 oscillates is a rotation axis X that is provided on a vehicle body 10 side and about which the lower arm 20 oscillates. In the present embodiment, the rotation axis X extends in the left-right direction of the vehicle body 10. The proximal end portion of the lower arm may be oscillatably supported by the floor portion in a direction such as diagonally forward, inward, diagonally rearward, or rearward relative to the wheel. In this case, the rotation axis that is provided on the vehicle body-side and about which the lower arm oscillates may extend in the left-right direction of the vehicle body, in the front-rear direction of the vehicle body, or in a direction diagonal to both the left-right direction and the front-rear direction.

A distal end portion of the lower arm 20 extends from the vehicle body-side support portion 13 toward the fender apron 16 (in the rear direction). A bearing portion 22 is attached to the distal end portion of the lower arm 20. The wheel 18 is rotatably supported by the bearing portion 22 in the fender apron 16. The bearing portion 22 is also supported by the knuckle arm 24. The knuckle arm 24 is supported by the vehicle body 10 via a spring 26 and a damper 28.

As described above, the proximal end portion of the lower arm 20 is oscillatably supported by the vehicle body-side support portion 13, and thus the lower arm 20 and the knuckle arm 24 support the wheel 18 in the fender apron 16 such that the wheel 18 can move in the up-down direction. In a state in which the moving direction of the wheel 18 is restricted by the lower arm 20 and the knuckle arm 24, the spring 26 and the damper 28 are located between the vehicle body 10 and the lower arm 20 and the knuckle arm 24. When the spring 26 and the damper 28 absorb a shock caused by the irregularities of the road surface while the automobile is running, the wheel 18 oscillates in the up-down direction relative to the vehicle body 10.

A vehicle-side device 80 is provided on the vehicle body 10 side, and a wheel-side device 90 is provided on a wheel 18 side. The vehicle-side device 80 is installed in the vehicle body 10. The vehicle-side device 80 is a device that does not move in the up-down direction together with the wheel 18. The wheel-side device 90 is installed in the wheel 18. The wheel-side device 90 is a device that moves in the up-down direction together with the wheel 18 relative to the vehicle body 10.

The wheel-side device 90 may be a sensor, an electric brake, a driving motor, or the like. The sensor is, for example, a sensor that detects the rotation speed of the wheel 18. The electric brake is a brake that includes a motor and the like, and brakes the rotation of the wheel 18 using electricity as the motive power. The electric brake may be an electric parking brake used when the automobile is parked, or a brake used when the automobile is running. The driving motor is a motor that is installed in the wheel 18 and causes the wheel 18 to rotate, and may be a so-called in-wheel motor.

The vehicle-side device 80 is a device that transmits and receives signals with respect to the wheel-side device 90 and supplies power to the wheel-side device 90. For example, the vehicle-side device 80 is an ECU (Electronic Control Unit) that receives signals from the sensor and controls the electric brake or the driving motor. In the present embodiment, the vehicle-side device 80 is provided in the vehicle body 10. The vehicle-side device 80 may be provided outside of the vehicle body 10.

A wiring module 30 is a member that connects the vehicle-side device 80 and the wheel-side device 90. The wiring module 30 is attached to the vehicle by being routed along a path that connects the vehicle-side device 80 and the wheel-side device 90.

In the present embodiment, an example is shown in which one vehicle-side device 80 and two wheel-side devices 90 are provided. However, the number of vehicle-side devices 80 and the number of wheel-side devices 90 are not limited thereto. A plurality of vehicle-side devices 80 may be provided. The number of wheel-side devices 90 may be one, or three or more. In the present embodiment, an example is shown in which one end portion of the wiring module 30 is connected to the vehicle-side device 80. The one end portion of the wiring module 30 may be connected to the vehicle-side device 80 via another wiring module. Also, in the present embodiment, an example is shown in which the other end portion of the wiring module 30 is connected to two wheel-side devices 90 at one location. The other end portion of the wiring module 30 may be branched and connected to a plurality of wheel-side devices 90 at different locations.

Wiring Module

Figure 2:
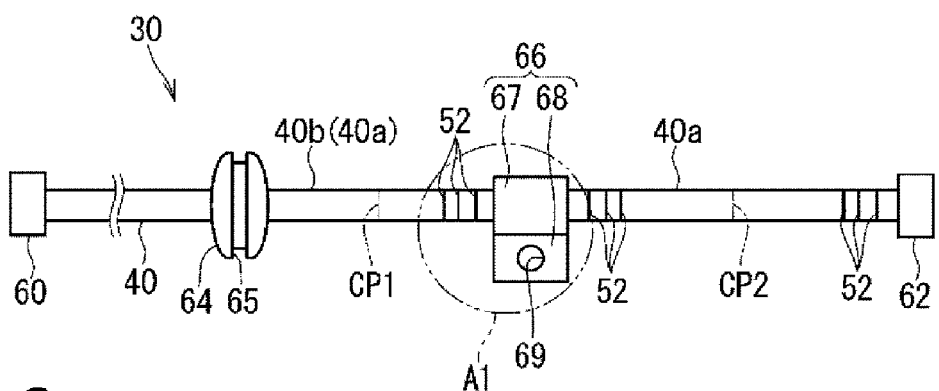
FIG. 2 is a schematic plan view of a suspension wiring module according to Embodiment 1.
Figure 3:
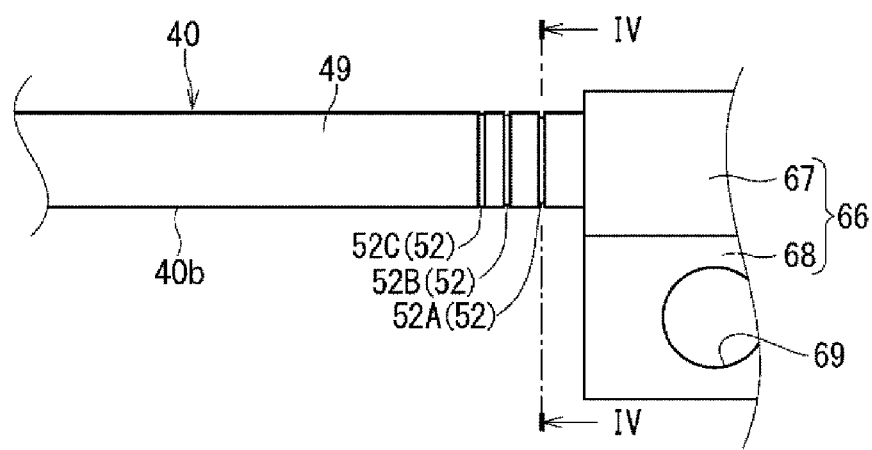
FIG. 3 is an enlarged view of region A1 shown in FIG. 2.
Figure 4:
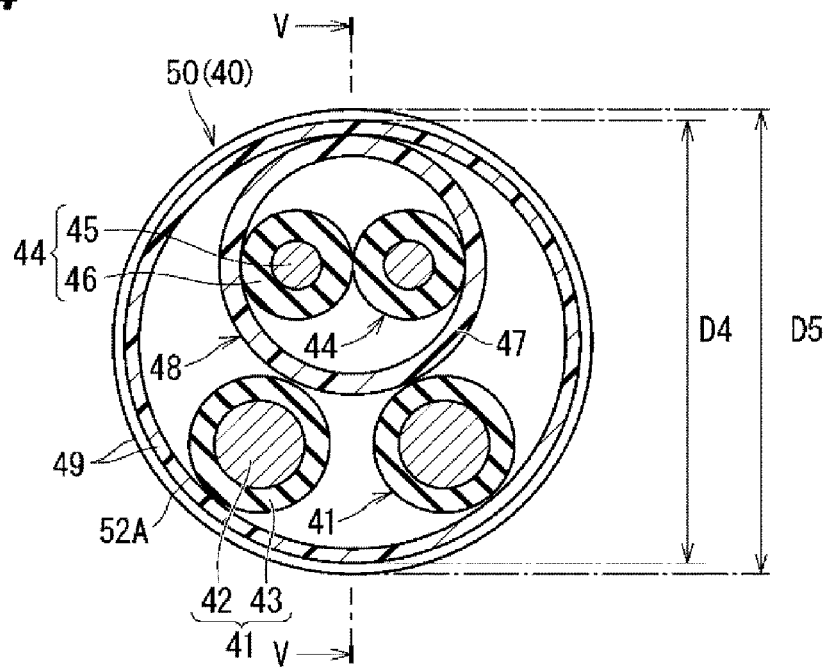
FIG. 4 is a horizontal cross-sectional view taken along the line IV-IV shown in FIG. 3.
Figure 5:
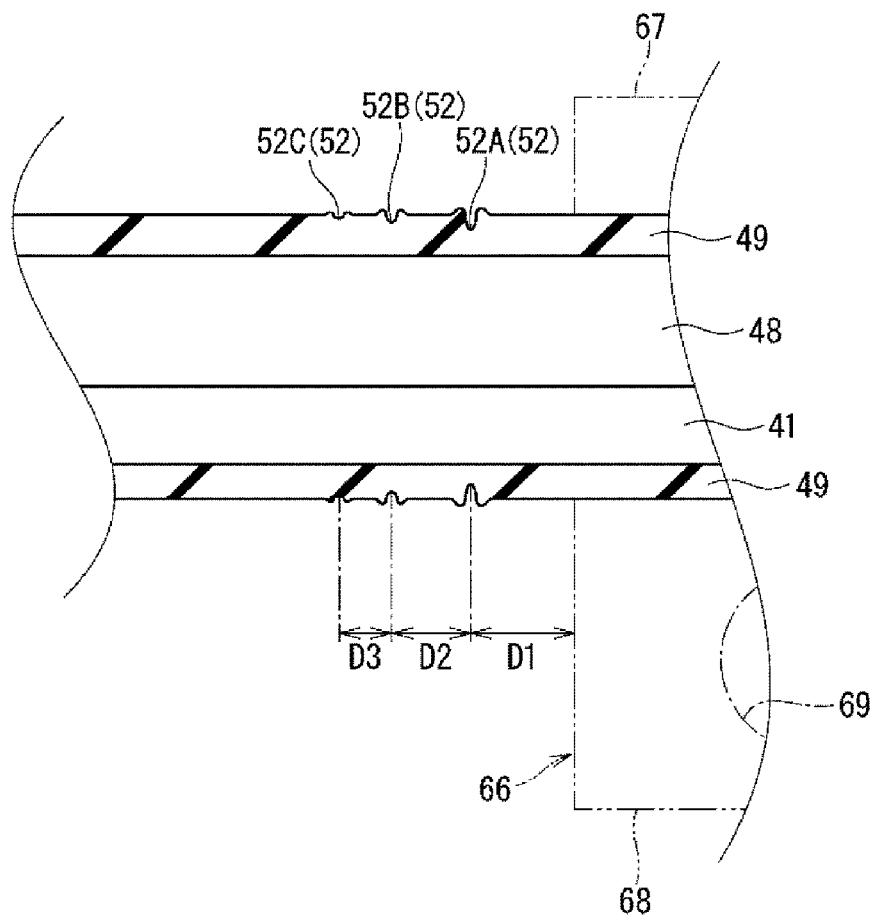
FIG. 5 is a vertical cross-sectional view taken along the line V-V shown in FIG. 4.

Next, the wiring module 30 will be described in detail with reference to FIGS. 2 to 4. FIG. 2 is a schematic plan view of the wiring module 30 according to Embodiment 1. FIG. 3 is an enlarged view of region A1 shown in FIG. 2. FIG. 4 is a horizontal cross-sectional view taken along the line IV-IV shown in FIG. 3. FIG. 5 is a vertical cross-sectional view taken along the line V-V shown in FIG. 4.

The wiring module 30 includes a suspension wiring member 40 (hereinafter referred to simply as a "wiring member 40"). In this example, the wiring module 30 further includes a plurality of fixing components 60, 62, 64, and 66.

Wiring Member

The wiring member 40 connects the vehicle-side device 80 and the wheel-side devices 90. The wiring member 40 includes a transmission line main body and at least one coating layer. The transmission line main body transmits electricity or light. The transmission line main body may be, for example, a conductor such as a core wire of an electric wire, a core or cladding of an optical fiber cable, or the like. The coating layer covers the transmission line main body. The coating layer is usually a resin layer. The coating layer is formed by, for example, extrusion-coating a resin around the transmission line main body. Here, an example will be described in which the wiring member 40 includes four electric wires 41 and 44. The four electric wires 41 and 44 are composed of two electric wires 41 and two electric wires 44.

The electric wires 41 are, for example, power supply lines. The two electric wires 41 are a plus wiring line and a minus wiring line. In the case where, for example, the wiring member 40 is connected to an electric brake, the electric wires 41 may be power supply lines that supply power for driving the electric brake. In the case where, for example, the wiring member 40 is connected to a driving motor, the electric wires 41 may be power supply lines that supply power for driving the driving motor.

The electric wires 44 are, for example, signal lines. In the case where, for example, the wiring member 40 is connected to a sensor, the electric wires 44 may be signal lines that output a detection signal of the sensor. The two electric wires 44 may be a pair of electric wires 44 for transmitting a differential signal. Alternatively, the electric wires 44 may be signal lines that transmit a control signal.

The configuration of the wiring member 40 is not limited to the configuration described above. For example, the wiring member may include only power supply lines. Alternatively, for example, the wiring member may include only signal lines.

The electric wires 41 may be thicker than the electric wires 44. In this case, a conductor cross-sectional area of an electric wire 41 may be larger than that of an electric wire 44 according to the thicknesses of the electric wires 41 and 44. For this reason, as described above, the electric wires 41 are suitably used as power supply lines, and the electric wires 44 are suitably used as signal lines.

Each of the electric wires 41 includes a core wire 42 and a coating 43. The core wire 42 is formed using copper, a copper alloy, aluminum, an aluminum alloy, or the like. The core wire 42 may be an assembly (usually, a twisted wire) of a plurality of strands, or a single strand. The coating 43 is formed by, for example, extrusion-coating a resin around the core wire 42. Each of the electric wires 44 also includes a core wire 45 and a coating 46, as with the electric wires 41. The four electric wires 41 and 44 are single-core coated electric wires.

A cable 48 is formed by forming a sheath 47 that serves as a coating layer around the two electric wires 44. The sheath 47 is made of a resin that covers the two electric wires 44. The sheath 47 is formed by extrusion-coating a resin around the two electric wires 44.

A cable 50 is formed by forming a sheath 49 around the two electric wires 41 and the cable 48. Accordingly, the wiring member 40 includes a portion that serves as the cable 50. The sheath 49 is made of a resin that covers the two electric wires 41 and the cable 48. The sheath 49 is formed by, for example, extrusion-coating a resin around the two electric wires 41 and the cable 48.

The configuration in which the two electric wires 44 are covered with the sheath 47 is not essential. In the sheath 49, a coating layer may not be formed around the two electric wires 44. Also, in the sheath 49, an outer armor member, such as a spirally wound adhesive tape, a corrugated tube, or a rubber tube, may be provided around the two electric wires 44.

In the sheath 49, none of a sheath, an outer armor member, and the like is provided around the two electric wires 41. However, in the sheath 49, a sheath may be provided around the two electric wires 41. In the sheath 49, an outer armor member, such as a spirally wound adhesive tape, a corrugated tube, or a rubber tube, may be provided around the two electric wires 41.

The outermost one of the at least one coating layer of the wiring member 40 serves as the outer coating. For the two electric wires 41, a coating 43 and a sheath 49 are provided as coating layers. For the two electric wires 44, a coating 46 and sheaths 47 and 49 are provide as coating layers. In this example, in the four electric wires 41 and 44, the sheath 49 serves as the outer coating. In the case where the sheath 49 is not provided for the four electric wires 41 and 44, the coatings 43 of the two electric wires 41 and the sheath 47 of the cable 48 together serve as the outer coating of the wiring member. Furthermore, in the case where the sheaths 47 and 49 are not provided for the four electric wires 41 and 44, the coatings 43 and 46 of the four electric wires 41 and 44 together serve as the outer coating of the wiring member.

Accordingly, in the case where the wiring member is composed of a single-core wire such as an electric wire 41, the outermost one of the coating layers of the single-core wire serves as the outer coating. In the case where the wiring member is composed of a multi-core wire such as a cable 50 as described above, the outermost coating layer (sheath) of the multi-core wire serves as the outer coating. As used herein, the term "multi-core wire" refers to an assembly of either one or both of single-core wires and multi-core wires, the assembly being bundled with a coating layer (sheath). The multi-core wire also encompasses a wire in which one coating layer is extrusion-coated around a plurality of core wires. In the case where the wiring member is a bundle wire, the coating layer of the outermost wire of the bundle wire serves as the outer coating. The term "bundle wire" refers to an assembly of either one or both of single-core wires and multi-core wires, the assembly having no sheath for bundling the wires. For example, in the case where the sheath 49 is not provided in the example given above, the wiring member is a bundle wire. When the bundle wire includes a large number of wires, there may be a wire that is located on the center side of the bundle wire and does not constitute the outer circumferential shape of the bundle wire. The coating layer of the wire that does not constitute the bundle wire is not included in the outer coating.

Arc-shaped grooves 52 are formed in the outer coating 49. The arc-shaped grooves 52 will be described later in detail.

Fixing Component

The fixing components 60, 62, 64, and 66 are components for positioning the wiring member 40 to the vehicle. The plurality of fixing components 60, 62, 64, and 66 are provided spaced apart from each other in an extension direction of the wiring member 40. In this example, the plurality of fixing components 60, 62, 64, and 66 include end portion connecting components 60 and 62, a grommet 64, and a bracket 66.

The end portion connecting components 60 and 62 are components for connecting the end portions of the wiring member 40 to the vehicle-side device 80 and the wheel-side device 90, respectively. In this example, the end portion connecting components 60 and 62 are connectors 60 and 62. The end portion connecting components may be, for example, screw terminals, or the like.

The connector 60 is provided at one end portion of the wiring member 40. The connector 60 is a vehicle body-side connector that is connected to the vehicle-side device 80. The connector 62 is provided at the other end portion of the wiring member 40. The connector 62 is a wheel-side connector that is connected to the wheel-side device 90. Each of the connectors 60 and 62 includes a connector housing made of a resin or the like. For example, terminals are provided at the end portions of the electric wires 41 and 44. By inserting the terminals into cavity formed in the connector housings, the connectors 60 and 62 are formed. The vehicle-side device 80 and the wiring member 40 are connected as a result of the connector 60 being connector-connected to the vehicle-side device 80. The wheel-side device 90 and the wiring member 40 are connected as a result of the connector 62 being connector-connected to the wheel-side device 90. As a result of the connector 60 being connector-connected to the vehicle-side device 80 and the connector 62 being connector-connected to the wheel-side device 90, the vehicle-side device 80 and the wheel-side device 90 are connected via the wiring member 40 so as to be capable of performing either one or both of power supply and communication.

The connector housings of the connectors 60 and 62 may be connectors molded separately from the electric wires 41 and 44. The connector housings of the connectors 60 and 62 may be insert-molded articles that have been insert-molded into the wiring member 40. That is, the connector housings of the connectors 60 and 62 may be molded through insert-molding using the terminals provided at the end portions of the electric wires 41 and 44 and the electric wires 41 and 44 as insert components.

At least one of one end portion and the other end portion of the wiring member 40 may be connected directly to the vehicle-side device 80 or the wheel-side device 90 via the connector 60 or 62. In this case, the wiring member is integrated with the vehicle-side device 80 or the wheel-side device 90. At this time, if a fixing component such as a bracket is included in the vehicle-side device 80 or the wheel-side device 90, the fixing component functions as a fixing component that positions and fixes the wiring member. For example, the wheel-side device 90 that is a wheel speed sensor or the like may be integrated with the wiring member through insert-molding.

The electric wires 41 and 44 are connected to the same connectors 60 and 62 at end portions on one side and the end portions on the other side, but this configuration is not essential. The electric wires 41 and 44 may be connected to different connectors at at least either one of end portions on one side or the end portions on the other side. Also, the electric wires 41 and 44 are connected to the same vehicle-side device 80 and the wheel-side device 90 at end portions on one side and the portions on the other side, but this configuration is not essential. The electric wires 41 and 44 may be connected to different devices at at least either one of end portions on one side or the end portions on the other side.

The grommet 64 is provided at an intermediate portion of the wiring member 40 in a lengthwise direction of the wiring member 40. The grommet 64 is an annular member formed using an elastic material such as rubber. The grommet 64 is externally fitted onto the wiring member 40. For example, an annular recess 65 into which the edge of a hole 17 is fitted is formed in the outer circumference of the grommet 64. The grommet 64 is provided between the wiring member 40 and the hole 17 formed in the vehicle body 10, or a gap therebetween. The grommet 64 can protect the wiring member 40 and suppress the intrusion of water into the vehicle body 10.

The bracket 66 is provided at an intermediate portion of the wiring member 40 in the lengthwise direction. The bracket 66 is provided between the grommet 64 and the connector 62. The bracket 66 is formed by, for example, stamping a metal plate. The bracket 66 includes a wiring attachment portion 67 and a vehicle attachment portion 68. The wiring attachment portion 67 is a portion that is attached to the wiring member 40. In this example, the wiring attachment portion 67 is attached to the wiring member 40 by being plastically deformed (crimped) to surround the wiring member 40. The vehicle attachment portion 68 is a portion that is attached to the vehicle. Here, an example will be described in which the vehicle attachment portion 68 is attached to a member of the vehicle that oscillates together with the wheel 18. The member that oscillates together with the wheel 18 is, for example, the knuckle arm 24 that rotatably supports the wheel 18. In this example, the vehicle attachment portion 68 includes a screw hole 69. For example, a bolt protrudes from the knuckle arm 24. A nut is threaded onto and fastened to the bolt inserted into the screw hole 69. As a result, the vehicle attachment portion 68 is attached to the knuckle arm 24. The bracket 66 may be attached to the wiring member 40 using a screwing structure or the like. The bracket 66 may be attached to the knuckle arm 24 through welding, using a fitting structure, or the like.

The fixing components 60, 62, 64, and 66 include vehicle body-side fixing components and wheel-side fixing components. The vehicle body-side fixing components are fixing components that are fixed to the vehicle body-side. The vehicle body-side fixing components are fixing components that are fixed to portions of the vehicle that do not oscillate in up-down direction together with the wheel 18. The wheel-side fixing components are fixing components that are fixed on the wheel 18-side. The wheel-side fixing components are fixing components that are fixed to portions that oscillate in the up-down direction together with the wheel 18. Specifically, here, the connector 60 and the grommet 64 correspond to the vehicle body-side fixing components. The connector 62 and the bracket 66 correspond to the wheel-side fixing components.

At least one section of the wiring member 40 is defined as an exterior section 40a. The exterior section 40a is a section provided outside of the cabin of the vehicle. In this example, the wiring member 40 is routed to the outside through the hole 17 formed in the fender apron 16. The hole 17 may be formed in a portion of the fender apron 16 that is radially external to the wheel 18 or a portion of the fender apron 16 that is internal to the wheel 18 in a width direction of the vehicle. A section extending from a portion of the wiring member 40 that is located outside of the hole 17 to the other end of the wiring member 40 that is connected to the wheel-side device 90 corresponds to the exterior section 40a. In the present embodiment, the grommet 64 is attached to the hole 17. Accordingly, a portion of the wiring member 40 extending from the grommet 64 to the connector 62 connected to the wheel-side device 90 corresponds to the exterior section 40a. Of course, the wiring member 40 may be routed to the outside through a hole formed in the floor portion 12 of the vehicle body 10.

At least a portion of the exterior section 40a is defined as a bent section 40b. The bent section 40b is a section that is repeatedly bent along with the oscillation of the suspension. The bent section 40b is a section between a vehicle body-side fixing component and a wheel-side fixing component. The vehicle body-side fixing component is located on one side of the bent section 40b, and the wheel-side fixing component is located on the other side of the bent section 40b. In this example, the bent section 40b is a section between the grommet 64 and the bracket 66.

The bent section 40b of the wiring member 40 is a portion between the vehicle body 10 and the wheel 18 that may be bent and deformed more than the other section between the vehicle body 10 and the wheel 18 as a result of the wheel 18 being moved relative to the vehicle body 10. The bent section 40b is determined according to the path and the fixed position of the wiring member 40 in the automobile, and the like. In this example, a portion of the exterior section 40a is defined as the bent section 40b, but the entire exterior section 40a may be defined as the bent section 40b, or the entire wiring member 40 may be defined as the bent section.

Figure 6:
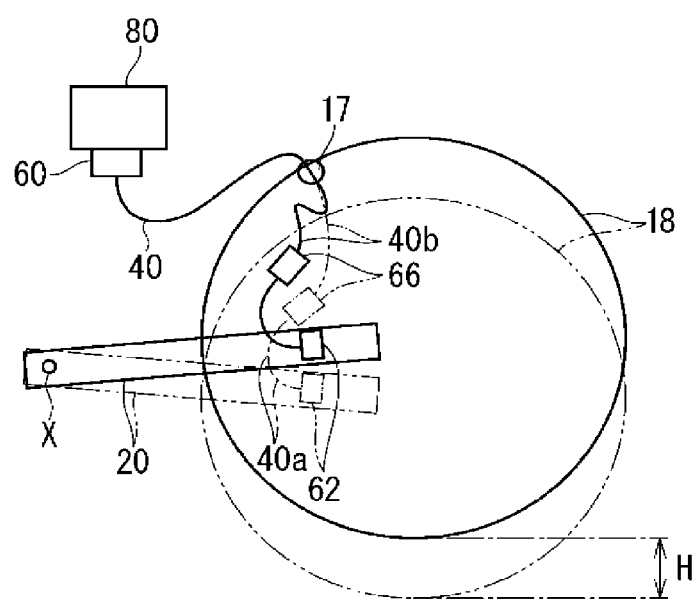
FIG. 6 is a schematic diagram illustrating how the wiring module oscillates.

FIG. 6 is a schematic diagram illustrating how the wiring module 30 oscillates. FIG. 6 shows how the bending of the bent section 40b changes when the wheel 18 oscillates up and down. In FIG. 6, a wheel 18 indicated by a solid line is located at a position higher than a wheel 18 indicated by a two-dot chain line by an amount corresponding to a height H.

Looking at the wiring member 40, the hole 17 is located at a position higher than the connector 62, and thus due to the up-down movement of the wheel 18, the distance between the hole 17 and the connector 62 is likely to vary. At this time, in a portion on the connector 60 side relative to the grommet 64, the grommet 64 and connector 60 are both vehicle body-side fixing components, and thus the distance therebetween is unlikely to vary even when the wheel 18 oscillates up and down. Likewise, in a portion on the connector 62 side relative to the bracket 66, the bracket 66 and the connector 62 are both wheel-side fixing components, and thus the distance therebetween is unlikely to vary even when the wheel 18 oscillates up and down. In contrast, in a portion between the grommet 64 and the bracket 66, the grommet 64 is a vehicle body-side fixing component and the bracket 66 is a wheel-side fixing component, and thus the distance therebetween is likely to vary according to the height H when the wheel 18 oscillates up and down.

In a state in which the wheel 18 is located at a higher position (the state indicated by a solid line in FIG. 6), the distance between the grommet 64 and the bracket 66 is short. Accordingly, the bent section 40b is bent at a steep angle between the grommet 64 and the bracket 66. Also, in a state in which the wheel 18 is located at a lower position (the state indicated by a two-dot chain line in FIG. 6), the distance between the grommet 64 and the bracket 66 is long. Accordingly, the bent section 40b is linear or bent at a moderate angle between the grommet 64 and the bracket 66. The bent section 40b is repeatedly bent by the repetition of the up-down movement of the wheel 18.

Arc-Shaped Groove

The arc-shaped grooves 52 are formed in the outer coating 49 of the exterior section 40a of the wiring member 40. In this example, a portion of the wiring member 40 that is located on the other end portion side relative to the grommet 64 is the exterior section 40a. Also, the outer coating 49 at this portion is referred to as sheath 49. Accordingly, the arc-shaped grooves 52 are formed in a portion of the sheath 49 that is located on the other end portion side of the wiring member 40 relative to the grommet 64. In this example, the arc-shaped grooves 52 are not formed in the outer coating 49 of an interior section of the wiring member 40. The arc-shaped grooves 52 may be formed in the outer coating 49 of the interior section of the wiring member 40.

The arc-shaped grooves 52 are formed in sections located between the plurality of fixing components 60, 62, 64, and 66. In this example, the arc-shaped grooves 52 are formed in a section between the bracket 66 and the connector 62. Also, the arc-shaped grooves 52 are formed in a section between the grommet 64 and the bracket 66. The section between the grommet 64 and the bracket 66 is also included in the bent section 40b. Accordingly, the arc-shaped grooves 52 are formed in the bent section 40b at the exterior section 40a. The arc-shaped grooves 52 does not necessarily need to be formed in both the section between the bracket 66 and the connector 62 and the section between the grommet 64 and the bracket 66, and may be formed in either one of the section between the bracket 66 and the connector 62 or the section between the grommet 64 and the bracket 66. In the case where a plurality of wheel-side fixing components are provided, a plurality of sections between the plurality of fixing components are present in the exterior section. In this case, the arc-shaped grooves may be formed in at least one of the plurality of sections between the plurality of fixing components in the exterior section.

Between a first fixing component and a second fixing component that is provided at a position next to the first fixing component, the arc-shaped grooves 52 are formed at at least a position close to the first fixing component relative to a center position between the first fixing component and the second fixing component. The position next to the first fixing component may be a position next thereto as viewed from the vehicle body-side end portion or a position next thereto as viewed from the wheel-side end portion.

In this example, the connector 60, the grommet 64, the bracket 66, and the connector 62 are provided in this order from the vehicle body-side end portion. They are provided in the opposite order from the wheel-side end portion. Accordingly, in this example, a combination of the first fixing component and the second fixing component may be a combination of the connector 60 and the grommet 64, a combination of the grommet 64 and the bracket 66, and a combination of the bracket 66 and the connector 62. In each combination, one member serves as the first fixing component, and the other member serves as the second fixing component.

In this example, as shown in FIG. 2, in the combination of the grommet 64 and the bracket 66, the arc-shaped grooves 52 are formed at a position close to the bracket 66 relative to a center position CP1 between the grommet 64 and the bracket 66. Likewise, in the combination of the bracket 66 and the connector 62, the arc-shaped grooves 52 are formed at a position close to the bracket 66 and a position close to the connector 62 relative to a center position CP2 between the bracket 66 and the connector 62. The arc-shaped grooves 52 do not necessarily need to be formed at three positions such as the position close to the bracket 66 in the section between the grommet 64 and the bracket 66, the position close to the bracket 66 in the section between the bracket 66 and the connector 62, and the position close to the connector 62 in the section between the bracket 66 and the connector 62, and one or two of the three positions may be omitted.

A first arc-shaped groove and a second arc-shaped groove are formed spaced apart from each other in the extension direction of the wiring member 40 from the first fixing component. The spacing between the first fixing component and the first arc-shaped groove is larger than the spacing between the first arc-shaped groove and the second arc-shaped groove. That is, the spacing between arc-shaped grooves 52 decreases as they get far from the first fixing component.

In this example, as shown in FIG. 5, three arc-shaped grooves 52A, 52B, and 52C are formed at a position close to the bracket 66 in the section between the grommet 64 and the bracket 66. The three arc-shaped grooves 52A, 52B, and 52C are arranged, from the bracket 66 side, in the order of the arc-shaped groove 52A, the arc-shaped groove 52B, and the arc-shaped groove 52C. A spacing D1 shown in FIG. 5 is the spacing between the bracket 66 and the arc-shaped groove 52A. Likewise, a spacing D2 shown in FIG. 5 is the spacing between the arc-shaped groove 52A and the arc-shaped groove 52B, and a spacing D3 is the spacing between the arc-shaped groove 52B and the arc-shaped groove 52C. The spacing D1 is larger than the spacing D2. Also, in this example, the spacing D2 is larger than the spacing D3. For this reason, the spacings of the arc-shaped grooves 52A, 52B, and 52C decrease as they get far from the bracket 66. Of course, the spacings D1, D2, and D3 may be the same. The spacing between the arc-shaped grooves 52 may increase as they get far from the bracket 66.

Portions of the outer coating 49 where the arc-shaped grooves 52 are formed are thinner than the other portion of the outer coating 49 where no arc-shaped grooves 52 are formed. An outer diameter D4 shown in FIG. 4 is the outer diameter of a portion of the outer coating 49 where the arc-shaped groove 52A is formed. Likewise, an outer diameter D5 shown in FIG. 4 is the outer diameter of a portion of the outer coating 49 where none of the arc-shaped grooves 52A, 52B, and 52C is formed. The outer diameter D4 is shorter than the outer diameter D5. Accordingly, the portion of the outer coating 49 where the arc-shaped groove 52A is formed is thinner than the portion of the outer coating 49 where none of the arc-shaped grooves 52A, 52B, and 52C is formed. Portions of the outer coating 49 where the arc-shaped grooves 52B and 52C are formed are also thinner than the portion of the outer coating 49 where none of the arc-shaped grooves 52A, 52B, and 52C is formed. Of course, the portions of the outer coating 49 where the arc-shaped grooves 52A, 52B, and 52C are formed may be as thick as or thicker than the portion of the outer coating 49 where none of the arc-shaped grooves 52A, 52B, and 52C is formed.

The arc-shaped grooves 52 are annular grooves. As shown in FIG. 4, the arc-shaped groove 52A is an annular groove formed around the entire circumference of the sheath 49. In the case where the wiring member is a bundle wire, when an arc-shaped groove is formed in the outer surface of each of all outermost wires, and the plurality of arc-shaped grooves together form an annular groove as a whole, it is deemed as the annular groove.

Of course, the arc-shaped grooves 52 do not necessarily need to be annular grooves. For example, the arc-shaped grooves 52 may be grooves with an angle of greater than 0 degrees and less than 360 degrees such as semi arc-shaped grooves. One end and the other end of each arc-shaped groove 52 are formed at the same position in the lengthwise direction of the wiring member 40. One end and the other end of each arc-shaped groove 52 may be formed at positions displaced with respect to each other in the lengthwise direction of the wiring member 40. The arc-shaped grooves 52 may extend spirally around the outer coating 49.

The arc-shaped groove 52A has a depth dimension deeper than that of the arc-shaped groove 52B. The arc-shaped groove 52B has a depth dimension deeper than that of the arc-shaped groove 52C. That is, the depth dimensions of the arc-shaped grooves 52A, 52B, and 52C get shallower as they get far from the bracket 66. Of course, the arc-shaped grooves 52A, 52B, and 52C may have the same depth dimension. Alternatively, the depth dimensions of the arc-shaped grooves 52A, 52B, and 52C may get deeper as they get far from the bracket 66.

Arc-shaped grooves 52 similar to the arc-shaped grooves 52A, 52B, and 52C are formed at a position close to the bracket 66 in the section between the bracket 66 and the connector 62. Arc-shaped grooves 52 similar to the arc-shaped grooves 52A, 52B, and 52C are also formed at a position close to the connector 62 in the section between the bracket 66 and the connector 62. Of course, the arc-shaped grooves 52 formed at three positions in total: two positions closer to the bracket 66; and one position close to the connector 60 or 62 may be formed in a different configuration.

The arc-shaped grooves 52 may be formed, for example, around the entire circumference of the sheath 49 through cutting using a blade. At this time, a portion of the sheath 49 may be or may not be removed through cutting. Also, for example, the arc-shaped grooves 52 may be formed in the manner described below. Specifically, two molds are prepared. Each mold has a pressing piece. The pressing piece has a plate-like shape, with one edge portion having a semi arc-shaped inner circumference. In the case where a plurality of arc-shaped grooves are formed in a wiring member, a plurality of pressing pieces are formed spaced apart from each other in each mold. Each pressing piece has a size corresponding to the shape of the arc-shaped groove. Then, when heating is performed and the sheath 49 is softened, in this state, the wiring member 40 is sandwiched by the pressing pieces of the two molds. As a result, the resin constituting a portion of the sheath 49 against which the pressing pieces are pressed escapes to the periphery thereof, and an arc-shaped groove 52 is thereby formed in the portion of the sheath 49 against which the pressing pieces are pressed. In the case where an arc-shaped groove 52 is formed by melting the sheath 49, as shown in FIG. 5, a raised portion made of resin may be formed around the arc-shaped groove 52.

<Advantageous Effects of Embodiment 1, etc.>

With the wiring module 30 configured as described above, as a result of the arc-shaped grooves 52 being formed in the outer coating 49 of the wiring member 40, the wiring member 40 can be easily bent. More specifically, as a result of the arc-shaped grooves 52 being formed in the outer coating 49, a stress applied when the wiring member 40 is bent is likely to concentrate on the arc-shaped grooves 52. Accordingly, the wiring member 40 can be easily bent.

The arc-shaped grooves 52 are formed in the section between the grommet 64 and the bracket 66. With this configuration, the section between the grommet 64 and the bracket 66 of the wiring member 40 can be easily bent. The section between the grommet 64 and the bracket 66 is the bent section 40b. The arc-shaped grooves 52 are formed in the bent section 40b of the exterior section 40a. With this configuration, a structure that allows the electric wires 41 and 44 to be easily bent is provided in a portion where the electric wires 41 and 44 are easily bent. Also, in the section between the grommet 64 and the bracket 66, the arc-shaped grooves 52 are formed at a position close to the bracket 66 relative to the center position CP1 between the grommet 64 and the bracket 66. With this configuration, a portion close to the bracket 66 in the section between the grommet 64 and the bracket 66 of the wiring member 40 can be easily bent.

Also, the spacing D1 between the bracket 66 and the arc-shaped groove 52A is larger than the spacing D2 between the arc-shaped groove 52A and the arc-shaped groove 52B. With this configuration, a situation is suppressed from occurring in which the wiring member 40 is steeply bent at a portion close to the bracket 66.

Also, the arc-shaped grooves 52 are formed in the section between the bracket 66 and the connector 62. With this configuration, the section between the bracket 66 and the connector 62 of the wiring member 40 can be easily bent. The section between the bracket 66 and the connector 62 is a section that is close to the wheel 18 and in which components are relatively densely provided. For this reason, the wiring member 40 is routed through gaps between the components. Accordingly, as a result of the section between the bracket 66 and the connector 62 being easily bent, the wiring member 40 can be easily routed in the vicinity of the wheel 18. Also, in the section between the bracket 66 and the connector 62, the arc-shaped grooves 52 are formed at a position close to the bracket 66 and a position close to the connector 62 relative to the center position CP2 between the bracket 66 and the connector 62. With this configuration, the portion close to the bracket 66 and the portion close to the connector 62 in the section between the bracket 66 and the connector 62 of the wiring member 40 can be easily bent.

Also, the outer diameter D4 of the portions of the outer coating 49 where the arc-shaped groove 52 are formed is smaller than the outer diameter D5 of the other portion of the outer coating 49 where no arc-shaped groove 52 is formed. With this configuration, as a result of the portions where the arc-shaped grooves 52 are formed being configured to be locally thin, the wiring member 40 can be easily bent.

Also, the arc-shaped grooves 52 are annular grooves. Accordingly, the wiring member 40 can be easily bent at any of the portions of the wiring member 40 in the circumferential direction where the annular grooves are formed.

Variation

A molded resin portion may be provided in a portion of the wiring member 40 where the bracket 66 is attached. The molded resin portion is a portion formed through insert-molding using the wiring member 40 as an insert component. The molded resin portion is provided, for example, to protect the wiring member 40 when crimping the wiring attachment portion 67 to the bracket 66. Also, the wiring attachment portion of the bracket may be used as an insert component together with the wiring member 40 when molding the molded resin portion. In this case, the molded resin portion is a member for attaching the bracket to the wiring member 40.

In the case where the electric wires 41 and 44 are branched midway, a molded resin portion may be provided in the branch portion. The bracket 66 may be attached to the molded resin portion provided in the branch portion.

The bracket 66 may be a vehicle body-side fixing component. In this case, the section between the bracket 66 and the connector 62 is defined as the bent section.

The structural elements in the embodiment and the variations described above may be combined as appropriate unless they are contradictory to each other.

LIST OF REFERENCE NUMERALS

10 Vehicle body
12 Floor portion
13 Vehicle body-side support portion
14 Body portion
16 Fender apron
17 Hole
18 Wheel
20 Lower arm
22 Bearing portion
24 Knuckle arm
26 Spring
28 Damper
30 Wiring module
40 Wiring member
40a Exterior section
40b Bent section
41, 44 Electric wire
42, 45 Core wire
43, 46 Coating layer
47 Sheath
48 Cable
49 Sheath (Outer coating)
50 Cable
52, 52A, 52B, 52C Arc-shaped groove
60 Vehicle body-side connector (Fixing component)
62 Wheel-side connector (Fixing component)
64 Grommet (Fixing component)
65 Annular groove
66 Bracket (Fixing component)
67 Wiring attachment portion
68 Vehicle attachment portion
69 Screw hole
80 Vehicle-side device
90 Wheel-side device
CP1, CP2 Center position
D1, D2, D3 Spacing
D4, D5 Outer diameter
H Height
X Rotation axis

What is claimed is:

1. A suspension wiring module comprising:
a suspension wiring member including a transmission line main body and at least one coating layer that covers the transmission line main body, and
a plurality of fixing components that position the suspension wiring member to a vehicle and include a first fixing component and a second fixing component that is provided at a position next to the first fixing component, the plurality of fixing components being provided spaced apart from each other in an extension direction of the suspension wiring member, wherein at least one section of the suspension wiring member is defined as an exterior section that is provided outside of a cabin of the vehicle, in the exterior section, an arc-shaped groove is formed in an outer coating that is the outermost one of the at least one coating layer, a first arc-shaped groove and a second arc-shaped groove are formed spaced apart from each other in the extension direction of the suspension wiring member from the first fixing component, and a spacing between the first fixing component and the first arc-shaped groove is larger than a spacing between the first arc-shaped groove and the second arc-shaped groove.

2. The suspension wiring module according to claim 1, wherein a portion of the outer coating where the arc-shaped groove is formed is thinner than a portion of the outer coating where the arc-shaped groove is not formed.

3. The suspension wiring module according to claim 1, wherein the arc-shaped groove is formed in a section that is included in the exterior section and is repeatedly bent along with an oscillation of a suspension.

4. The suspension wiring module according to claim 1, wherein the arc-shaped groove is an annular groove.

5. The suspension wiring module according to claim 1, wherein the first fixing component is a wheel-side fixing component, and the second fixing component is a vehicle body-side fixing component.

6. The suspension wiring module according to claim 1, wherein the first arc-shaped groove has a depth dimension deeper than that of the second arc-shaped groove.

* * * * *